(12) United States Patent
Omi

(10) Patent No.: US 10,358,016 B2
(45) Date of Patent: Jul. 23, 2019

(54) AIR CONDITIONER FOR VEHICLE

(71) Applicant: DENSO CORPORATION, Kariya, Aichi-pref. (JP)

(72) Inventor: Yasumitsu Omi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/527,355

(22) PCT Filed: Oct. 19, 2015

(86) PCT No.: PCT/JP2015/005257
§ 371 (c)(1),
(2) Date: May 17, 2017

(87) PCT Pub. No.: WO2016/092729
PCT Pub. Date: Jun. 16, 2016

(65) Prior Publication Data
US 2017/0326949 A1 Nov. 16, 2017

(30) Foreign Application Priority Data
Dec. 10, 2014 (JP) .................... 2014-249628

(51) Int. Cl.
B60H 1/32 (2006.01)
B60H 1/00 (2006.01)
B60H 1/03 (2006.01)

(52) U.S. Cl.
CPC ............... *B60H 1/323* (2013.01); *B60H 1/00* (2013.01); *B60H 1/00514* (2013.01); *B60H 1/03* (2013.01); *B60H 1/32* (2013.01); *B60H 1/3233* (2013.01); *B60H 2001/00928* (2013.01); *B60H 2001/00949* (2013.01)

(58) Field of Classification Search
CPC .. B60H 1/00207; B60H 1/323; B60H 1/3233; B60H 2001/00214; B60H 2001/00221; B60H 2001/00228; B60H 2001/00928
See application file for complete search history.

(56) References Cited

U.S. PATENT DOCUMENTS 2,134,724 A * 11/1938 McClanahan ...... B60H 1/00371
165/122
3,834,451 A * 9/1974 Kozinski ............ B60H 1/00057
165/43

(Continued)

FOREIGN PATENT DOCUMENTS

CN 101251096 A 8/2008
JP 4718745 B2 7/2011

Primary Examiner — Christopher R Zerphey
(74) Attorney, Agent, or Firm — Harness, Dickey & Pierce, P.L.C.

(57) ABSTRACT

An air conditioner for a vehicle includes a first heat exchanger that exchanges heat between a refrigerant in a refrigeration cycle and a heat medium, a second heat exchanger that exchanges heat between air to be blown into a vehicle interior space and the heat medium, and a casing disposed in the vehicle interior space to form an air passage through which the air flows and to accommodate the second heat exchanger. The first heat exchanger is disposed under the casing, and a partition wall for partitioning an engine room from the vehicle interior space is interposed between the first heat exchanger and the casing.

17 Claims, 10 Drawing Sheets

(56) References Cited

U.S. PATENT DOCUMENTS

| | | | |
|---|---|---|---|
| 3,990,505 A * | 11/1976 | Davenport | B60H 1/00 165/43 |
| 5,265,437 A * | 11/1993 | Saperstein | B60H 1/3229 62/243 |
| 5,797,277 A * | 8/1998 | Hong | B60H 1/00878 62/285 |
| 5,875,643 A * | 3/1999 | Kanai | B60H 1/00878 62/279 |
| 6,422,301 B1 * | 7/2002 | Scoccia | B60H 1/3233 165/42 |
| 6,910,346 B2 * | 6/2005 | Amaral | B60H 1/00907 62/244 |
| 9,694,651 B2 * | 7/2017 | Zeigler | B60H 1/00378 |
| 9,802,458 B2 * | 10/2017 | Harke | B60H 1/28 |
| 2002/0014330 A1 * | 2/2002 | Guyonvarch | B60H 1/00007 165/202 |
| 2003/0201097 A1 | 10/2003 | Zeigler et al. | |
| 2004/0035130 A1 | 2/2004 | Amaral et al. | |
| 2004/0050086 A1 | 3/2004 | Amaral et al. | |
| 2004/0050089 A1 | 3/2004 | Amaral | |
| 2004/0089003 A1 | 5/2004 | Amaral et al. | |
| 2004/0089014 A1 | 5/2004 | Amaral et al. | |
| 2005/0161211 A1 | 7/2005 | Zeigler et al. | |
| 2007/0131408 A1 | 6/2007 | Zeigler et al. | |
| 2014/0374081 A1 | 12/2014 | Kakehashi et al. | |
| 2017/0144510 A1 | 5/2017 | Zeigler et al. | |

* cited by examiner

CONDENSED WATER

COOLANT

REFRIGERANT

CONDENSED WATER

AIR CONDITIONER FOR VEHICLE

CROSS REFERENCE TO RELATED APPLICATIONS

This application is a U.S. National Phase Application under 35 U.S.C 371 of International Application No. PCT/JP2015/005257 filed on Oct. 19, 2015 and published in Japanese as WO 2016/092729 A1 on Jun. 16, 2016. This application is based on and claims the benefit of priority from Japanese Patent Application No. 2014-249628 filed on Dec. 10, 2014. The entire disclosures of all of the above applications are incorporated herein by reference.

FIELD OF THE INVENTION

The present disclosure relates to an air conditioner for a vehicle.

BACKGROUND ART

Conventionally, for example, Patent Document 1 describes an air cooling-heating device for an automobile that includes a refrigerant-coolant heat exchanger and a coolant-air heat exchanger. The refrigerant-coolant heat exchanger exchanges heat between a refrigerant and a coolant in a refrigeration cycle, thereby cooling and heating the coolant. The coolant-air heat exchanger exchanges heat between the coolant and air in the refrigeration cycle, thereby cooling and heating the air.

The refrigerant in the refrigeration cycle of the related art cools and heats the air via the coolant to perform air cooling and heating of a cabin.

In such related art, the refrigerant-coolant heat exchanger is installed in an engine room, while the coolant-air heat exchanger is installed in the cabin.

RELATED ART DOCUMENT

Patent Document

Patent Document 1: Japanese Patent Publication No. 4718745

SUMMARY OF THE INVENTION

Nevertheless, based on the studies conducted by the inventors of the present disclosure, the installation of the refrigerant-coolant heat exchanger in the engine room might impair the collision safety. That is, the presence of the refrigerant-coolant heat exchanger reduces a buffer space in the engine room (space to be collapsed upon collision of the vehicle), potentially causing the cabin to be compressed upon collision of the vehicle.

Furthermore, in the related art described above, the refrigerant in the refrigeration cycle cools and heats the air via the coolant, thereby possibly impairing the air-temperature controllability. That is, as the coolant has a large heat capacity, it will take a long time to change the temperatures of the coolant and air to target ones, which might degrade the comfort of the air conditioning for occupants of the vehicle.

The present disclosure has been made in view of the foregoing matters, and it is an object of the present disclosure to achieve both improvements in the collision safety and the air-temperature controllability.

An air conditioner for a vehicle according to an aspect of the present disclosure includes a first heat exchanger that exchanges heat between a refrigerant in a refrigeration cycle and a heat medium, a second heat exchanger that exchanges heat between air to be blown into a vehicle interior space and the heat medium, and a casing disposed in the vehicle interior space to form an air passage through which the air flows. The casing is adapted to accommodate the second heat exchanger. Furthermore, the first heat exchanger is disposed under the casing, and a partition wall for partitioning an engine room from the vehicle interior space is interposed between the first heat exchanger and the casing.

With this arrangement, the first heat exchanger is not positioned between an engine and the casing in a front-back direction of the vehicle, and thereby a buffer space for collision of the vehicle can be ensured between the engine and the casing. Thus, even upon collision of the vehicle, the engine can be prevented from pushing the casing into the vehicle interior space, and thereby it can avoid the failure of sufficiently protecting an occupant from the compression of the vehicle interior space by the collision of the vehicle.

The first heat exchanger is disposed under the casing, so that a heat medium pipe between the first heat exchanger and the second heat exchanger can be shortened. Thus, the amount of the heat medium can be decreased, thereby reducing the heat capacity of the heat medium to a lower level. Furthermore, such a low heat capacity of the heat medium can suppress the impairment of the air-temperature controllability.

Therefore, the collision safety can be improved, and simultaneously the air-temperature controllability can be improved.

DESCRIPTION OF EMBODIMENTS

Figure 1:
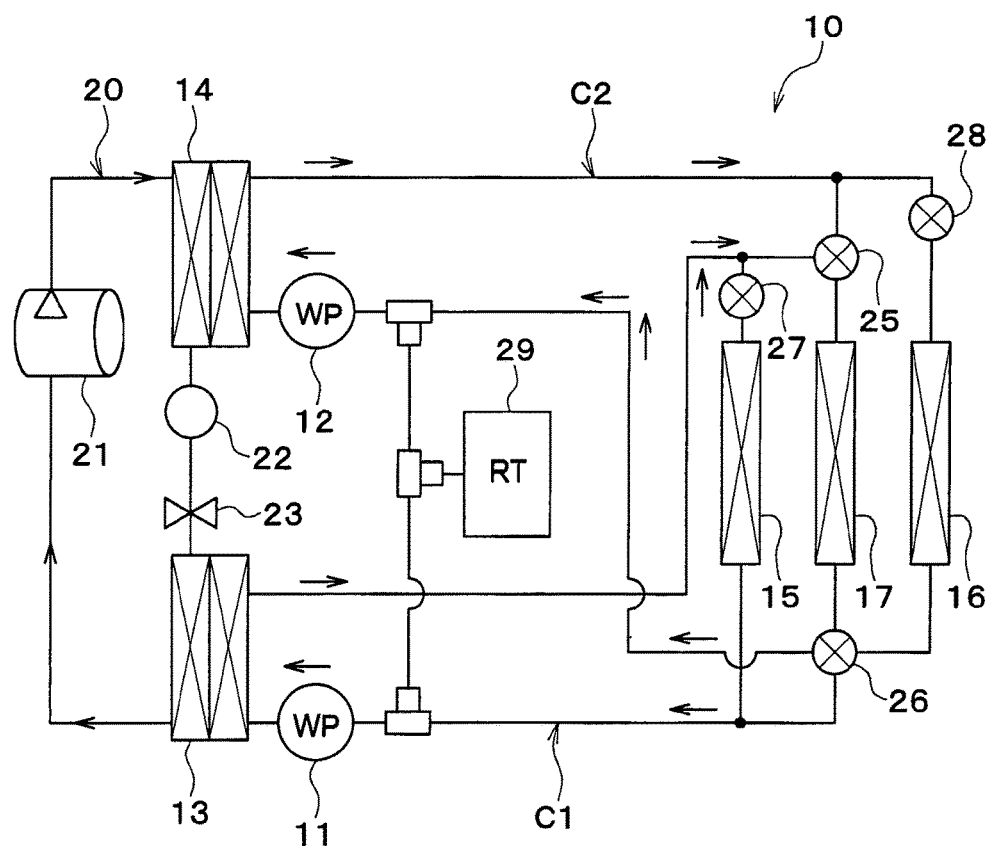
FIG. 1 is an entire configuration diagram of a vehicle air conditioner according to a first embodiment.

Embodiments will be described below with reference to the accompanying drawings. Note that in the embodiments below, the same or equivalent parts are indicated by the same reference characters throughout the figures.

(First Embodiment)

A first embodiment will be described below based on FIGS. 1 to 7. The upward, downward, frontward, backward, leftward, and rightward arrows in the figures indicate the up, down, front, back, left, and right directions, respectively.

A vehicle air conditioner 10 shown in FIG. 1 includes a first pump 11, a second pump 12, a chiller 13, a capacitor 14, a cooler core 15, a heater core 16, and a radiator 17.

Each of the first pump 11 and the second pump 12 is an electric pump that draws and discharges a coolant (heat medium). The coolant is a fluid as the heat medium. In this embodiment, the coolant suitable for use is a liquid that contains at least ethylene glycol, dimethylpolysiloxane, or a nanofluid, or an antifreeze solution.

The chiller 13, the capacitor 14, the cooler core 15, the heater core 16, and the radiator 17 are coolant circulation devices (heat-medium circulation devices) through which the coolant circulates.

The chiller 13 and the capacitor 14 serve as a refrigerant-coolant heat exchangers (first heat exchanger) that exchanges heat between the refrigerant and the coolant in a refrigeration cycle 20.

The chiller 13 is a low-pressure side heat exchanger (heat-medium cooling heat exchanger) that exchanges heat between the low-pressure side refrigerant and the coolant in the refrigeration cycle 20 to absorb heat from the coolant into the low-pressure side refrigerant, thereby cooling the coolant.

The capacitor 14 is a high-pressure side heat exchanger (heat dissipation device) that exchanges heat between the high-pressure side refrigerant and the coolant in the refrigeration cycle 20 to dissipate heat from the high-pressure side refrigerant into the coolant.

The refrigeration cycle 20 is a vapor-compression refrigerator that includes a compressor 21, the capacitor 14, a receiver 22, an expansion valve 23, and the chiller 13. The refrigeration cycle 20 in this embodiment forms a subcritical refrigeration cycle in which a high-pressure side refrigerant pressure does not exceed the critical pressure of the refrigerant, using a fluorocarbon refrigerant as the refrigerant.

The compressor 21 is an electric compressor driven by power supplied from a battery, or a variable capacity compressor driven by an engine. The compressor 21 draws, compresses, and discharges the refrigerant in the refrigeration cycle 20.

The capacitor 14 is a condenser that exchanges heat between a high-pressure side refrigerant (gas-phase refrigerant) discharged from the compressor 21 and the coolant, thereby condensing the high-pressure side refrigerant. The receiver 22 is a gas-liquid separator that separates a gas-liquid two-phase refrigerant flowing out of the capacitor 14 into a gas-phase refrigerant and a liquid-phase refrigerant, and then causes the liquid-phase refrigerant obtained by the separation to flow toward the expansion valve 23.

The expansion valve 23 is a decompression device that decompresses and expands the liquid-phase refrigerant flowing out of the receiver 22. The chiller 13 is an evaporator that evaporates a low-pressure side refrigerant decompressed and expanded by the expansion valve 23 by exchanging heat between the low-pressure side refrigerant and the coolant.

The cooler core 15 and the heater core 16 serve as an air-coolant heat exchanger (second heat exchanger) that exchanges heat between the coolant and air to be blown into the vehicle interior.

The cooler core 15 is an air cooling heat exchanger that exchanges heat between the coolant cooled by the chiller 13 and the air to be blown into the vehicle interior, thereby cooling the air.

The heater core 16 is an air heating heat exchanger that exchanges heat between the coolant heated by the capacitor 14 and the air to be blown into the vehicle interior, thereby heating the air.

The radiator 17 is a heat dissipation device (heat medium-air heat exchanger) that exchanges the coolant and the outside air (vehicle exterior air), thereby dissipating heat from the coolant into the outside air.

The first pump 11, the chiller 13, and the cooler core 15 configure a first coolant circuit C1 (first heat medium circuit). In the first coolant circuit C1, the coolant (first heat medium) circulates through the first pump 11, the chiller 13, the cooler core 15, and the first pump 11 in this order.

The second pump 12, the capacitor 14, and the heater core 16 configure a second coolant circuit C2 (second heat medium circuit). In the second coolant circuit C2, the coolant (second heat medium) circulates through the second pump 12, the capacitor 14, the heater core 16, and the second pump 12 in this order.

The radiator 17 is connected to both the first coolant circuit C1 and the second coolant circuit C2. The radiator 17 is arranged in parallel with the cooler core 15 and the heater core 16 with respect to the flow of the coolant.

Switching valves 25 and 26 are disposed at connection portions between the radiator 17 and the first coolant circuit C1 and between the radiator 17 and the second coolant circuit C2, respectively. The switching valves 25 and 26 are adapted to switch between a state in which the radiator 17 is connected to the first coolant circuit C1 to allow the coolant in the first coolant circuit C1 to flow through the radiator 17 and a state in which the radiator 17 is connected to the second coolant circuit C2 to allow the coolant in the second coolant circuit C2 to flow through the radiator 17.

A first on-off valve 27 is disposed in the first coolant circuit C1. The first on-off valve 27 opens and closes a coolant flow path on the cooler core 15 side. When the switching valves 25 and 26 connect the radiator 17 to the first coolant circuit C1, the first on-off valve 27 closes the coolant flow path on the cooler core 15 side, so that the coolant in the first coolant circuit C1 can flow through the radiator 17 while bypassing the cooler core 15.

A second on-off valve 28 is disposed in the second coolant circuit C2. The second on-off valve 28 opens and closes a coolant flow path on the heater core 16 side. When the switching valves 25 and 26 connect the radiator 17 to the second coolant circuit C2, the second on-off valve 28 closes the coolant flow path on the heater core 16 side, so that the coolant in the second coolant circuit C2 can flow through the radiator 17 while bypassing the heater core 16.

The operations of the switching valves 25 and 26, the first on-off valve 27, and the second on-off valve 28 are controlled by a controller (not shown).

A reserve tank 29 is connected to both the first coolant circuit C1 and the second coolant circuit C2. The reserve tank 29 is a coolant reservoir that stores therein extra coolant. The reserve tank 29 is connected to the first coolant circuit C1 on the coolant suction side of the first pump 11. The reserve tank 29 is connected to the second coolant circuit C2 on the coolant suction side of the second pump 12.

Figure 2:
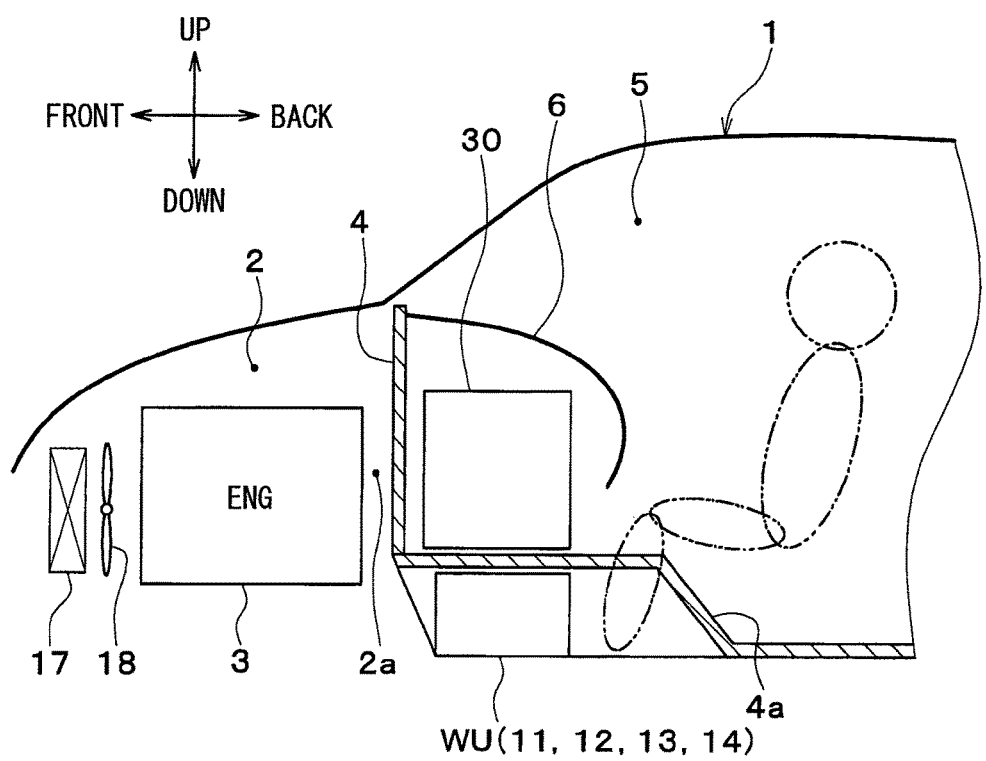
FIG. 2 is a cross-sectional view of a vehicle equipped with the vehicle air conditioner in the first embodiment.

As shown in FIG. 2, the radiator 17 is disposed at a foremost part of an engine room 2 of the vehicle 1. The engine room 2 is an engine accommodation space that accommodates therein an engine 3 and is formed at the front side of the vehicle relative to a firewall 4.

The engine 3 is disposed at the rear side of the radiator 17. The firewall 4 is a partition wall that partitions the engine room 2 from a vehicle interior space 5. The radiator 17 receives the outside air blown by an exterior blower 18. Thus, traveling air can hit the radiator 17 during traveling of the vehicle.

A dashboard 6 (instrument panel) is disposed at the foremost part of the vehicle interior space 5. An interior air conditioning unit 30 is disposed inside the dashboard 6.

Figure 3:
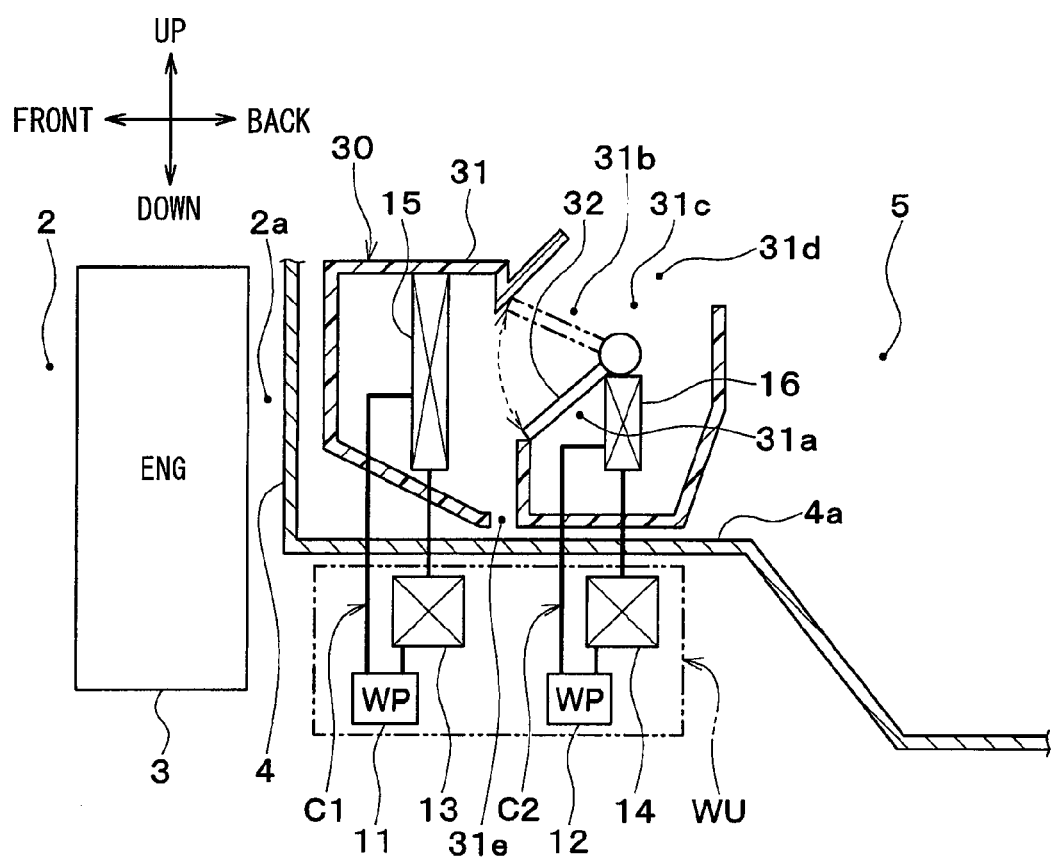
FIG. 3 is a partly enlarged view of FIG. 2.

As shown in FIG. 3, the interior air conditioning unit 30 has a casing 31. The casing 31 forms an air passage through which the air blown by an interior blower (not shown) flows, while forming an outer shell of the interior air conditioning unit 30.

The casing 31 is formed of resin (for example, polypropylene) with some elasticity and excellent strength. The interior blower is an electric blower that includes a centrifugal multiblade fan (sirocco fan) to be driven by an electric motor.

The cooler core 15 and the heater core 16 are accommodated in the casing 31. The cooler core 15 and the heater core 16 are arranged in the air passage of the casing 31 in this order with respect to the air flow direction.

An inside/outside air switching box (not shown) as an inside/outside air switch is disposed on the most upstream side of the ventilation-air flow in the casing 31. The inside/outside air switching box switches between the inside air (vehicle interior air) and the outside air (vehicle exterior air) to guide the selected air into the casing 31.

Within the casing 31, a heater core passage 31a and a bypass passage 31b are formed in parallel with each other on the downstream side of the air flow of the cooler core 15. The heater core passage 31a allows the air passing through the cooler core 15 to flow through the heater core 16. The bypass passage 31b allows the air passing through the cooler core 15 to flow while bypassing the heater core 16.

A mixing space 31c is formed on the downstream side of the air flow of the heater core passage 31a and the bypass passage 31b in the casing 31 so as to mix hot air flowing out of the heater core passage 31a and cold air flowing out of the bypass passage 31b.

An air mix door 32 is disposed within the casing 31 on the downstream side of the air flow of the cooler core 15 and on the inlet sides of the heater core passage 31a and the bypass passage 31b.

The air mix door 32 serves as an air-volume ratio adjuster that continuously adjusts the ratio of the volume of the air flowing through the heater core passage 31a to that of the air flowing through the bypass passage 31b. The temperature of ventilation air mixed in the mixing space 31c is changed by the ratio of the volume of the air passing through the heater core passage 31a to that passing through the bypass passage 31b. Therefore, the air mix door 32 serves as a temperature adjustment portion adapted to adjust the temperature of the air in the mixing space 31c (the temperature of the ventilation air to be blown into the vehicle interior).

The air mix door 32 is the so-called cantilever door that includes a rotary shaft driven by an electric actuator (not shown) and a plate-shaped door main body coupled to the rotary shaft common therebetween.

The casing 31 has air outlets 31d formed on the most downstream side of the air flow. The air having its temperature adjusted in the mixing space 31c is blown through the air outlets 31d into the vehicle interior space 5, which is a space to be air-conditioned.

The air outlets 31d include a face air outlet, a foot air outlet, and a defroster air outlet. The face air outlet is an upper-body side air outlet that blows the conditioned air toward the upper body of an occupant in the vehicle interior. The foot air outlet is a foot-side air outlet (lower-body side air outlet) that blows the conditioned air toward the feet (lower body) of the occupant. The defroster air outlet is a windowpane side air outlet that blows the conditioned air toward the inner surface of a windshield of the vehicle.

Air-outlet mode doors (not shown) are disposed on the upstream sides of the air flow of the face air outlet, the foot air outlet, and the defroster air outlet. The air-outlet mode doors serve as air-outlet mode switches that are adapted to switch the air-outlet mode by changing the opening areas of the face air outlet, the foot air outlet, and the defroster air outlet. The air-outlet mode doors are actuated and rotated by respective electric actuators (not shown).

The air outlet modes include a face mode, a bi-level mode, a foot mode, a foot-defroster mode, and a defroster mode.

In the face mode, the face air outlet is fully opened to blow the air from the face air outlet toward the upper body of the occupant in the vehicle interior. In the bi-level mode, both the face air outlet and the foot air outlet are opened to blow air toward the upper body and feet of the occupant in the vehicle interior.

In the foot mode, the foot air outlet is fully opened with the defroster air outlet opened only by a small opening degree to blow the air mainly from the foot air outlet. In the foot-defroster mode, the foot air outlet and the defroster air outlet are opened by the same degree to blow the air from both the foot air outlet and the defroster air outlet.

In the defroster mode, the defroster air outlet is fully opened to blow the air from the defroster air outlet to the inner surface of the windshield of the vehicle.

A drain-water discharge port 31e is formed under the cooler core 15 in the casing 31. The drain-water discharge port 31e is a condensed-water discharge portion that discharges condensed water (drain water) generated by the cooler core 15 to the outside of the vehicle. A drain hose (not shown) that guides the condensed water to the outside of the vehicle is connected to the drain-water discharge port 31e. The drain hose is a condensed-water discharge hose for discharging the condensed water generated within the casing 31 to the outside of the vehicle.

Figure 4:
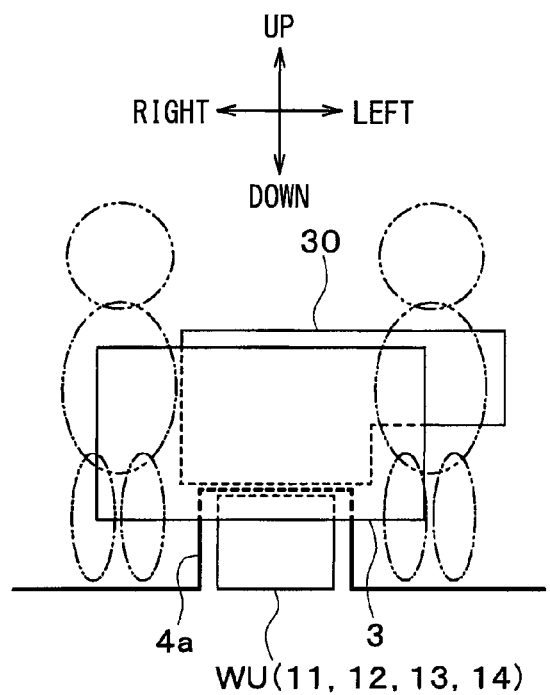
FIG. 4 is an explanatory diagram for explaining a mounting position of the vehicle air conditioner in the first embodiment.

As illustrated in FIGS. 2, 3, and 4, the firewall 4 has a protruding portion 4a located at the center in the right-left direction of the vehicle and expanding in a tunnel shape toward the position directly below the interior air conditioning unit 30. A space formed under the protruding portion 4a is a vehicle exterior space that communicates with the engine room 2.

The vehicle exterior space (engine room 2) located under the protruding portion 4a accommodates therein a coolant circuit unit WU that includes the first pump 11, the second pump 12, the chiller 13, and the capacitor 14. The protruding portion 4a is an interposition portion that is interposed between the interior air conditioning unit 30 and the coolant circuit unit WU.

The coolant circuit unit WU is disposed in the vehicle exterior space positioned under the interior air conditioning unit 30. The coolant circuit unit WU is separated from the interior air conditioning unit 30 by the firewall 4.

The coolant circuit unit WU is positioned not to be sandwiched between the engine 3 and the interior air conditioning unit 30 in the front-back direction of the vehicle.

In this way, a buffer space 2a for collision of a vehicle is formed between the engine 3 and the interior air conditioning unit 30.

In other words, the chiller 13 and the capacitor 14 are disposed under the casing 31, and the firewall 4 is interposed between the casing 31 and each of the chiller 13 and the capacitor 14. Thus, the chiller 13 and the capacitor 14 are disposed in the vehicle exterior space (engine room 2) not to be sandwiched between the engine 3 and the casing 31 in the front-back direction of the vehicle.

Figure 5:
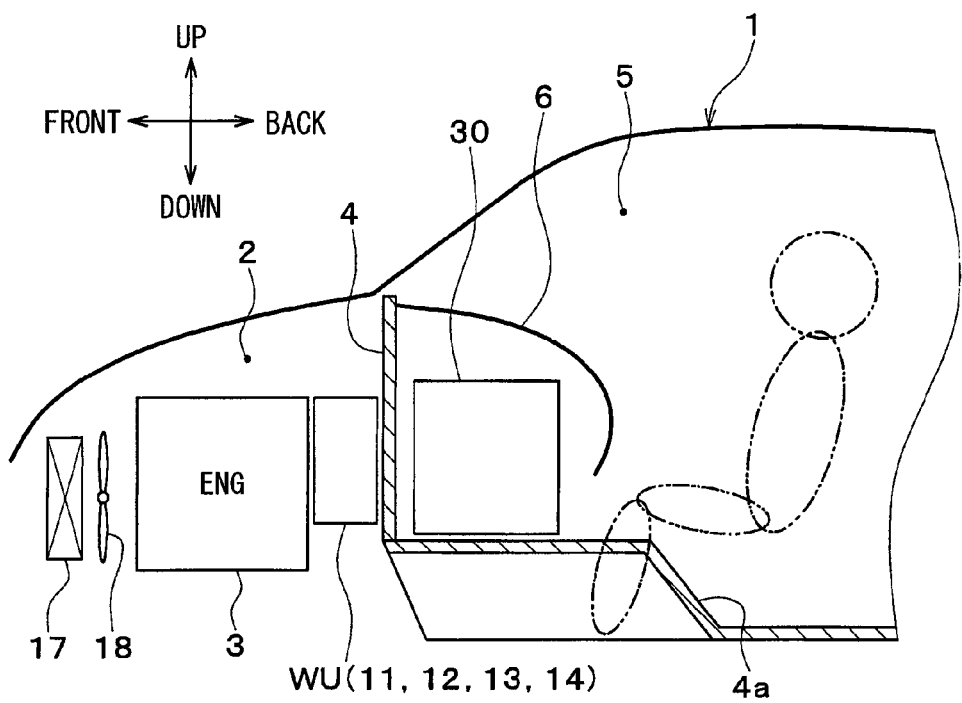
FIG. 5 is a cross-sectional view of a vehicle equipped with a vehicle air conditioner in a comparative example.
Figure 6:
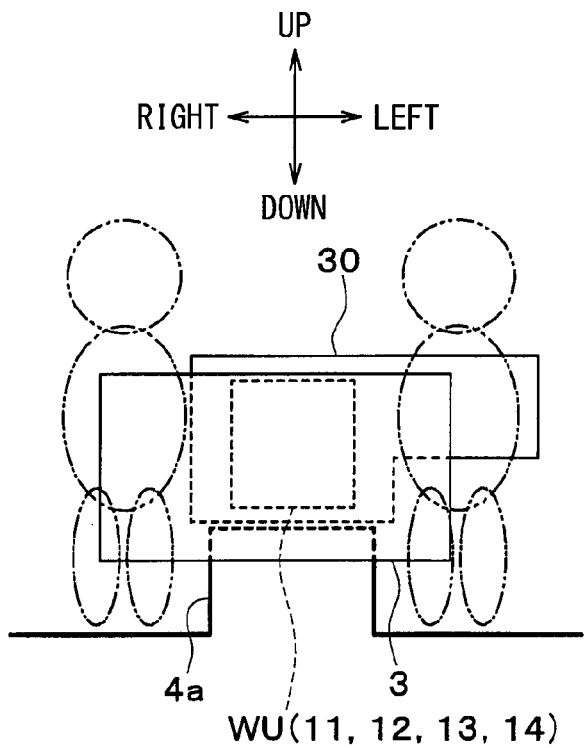
FIG. 6 is an explanatory diagram for explaining a mounting position of the vehicle air conditioner in the comparative example.

In a comparative example shown in FIGS. 5 and 6, the coolant circuit unit WU is disposed in the engine room 2 to be sandwiched between the engine 3 and the interior air conditioning unit 30 in the front-back direction of the vehicle. In this comparative example, a buffer space for collision of the vehicle cannot be sufficiently formed between the engine 3 and the interior air conditioning unit 30. Thus, upon collision of the vehicle, the engine 3 would push the interior air conditioning unit 30 into the vehicle interior space 5, so that an occupant cannot be protected enough from the compression of the vehicle interior space 5 by the collision of the vehicle.

In contrast, since in this embodiment, the coolant circuit unit WU is not sandwiched between the engine 3 and the interior air conditioning unit 30 in the front-back direction of the vehicle, the adequate buffer space 2a for collision of a vehicle can be ensured between the engine 3 and the interior air conditioning unit 30 (see FIG. 2). Thus, even upon collision of the vehicle, the engine 3 can be prevented from pushing the interior air conditioning unit 30 into the vehicle interior space 5, which can avoid the failure of sufficiently protecting an occupant from the compression of the vehicle interior space 5 by the collision of the vehicle.

Figure 7:
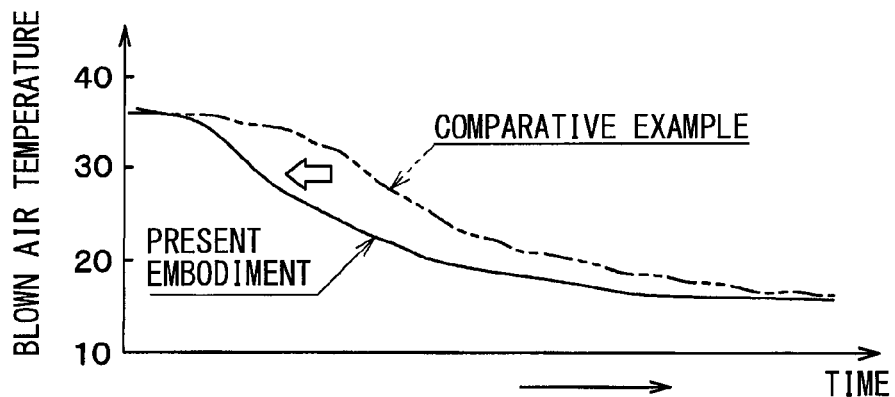
FIG. 7 is a graph showing an example of changes in the blown air temperature over time in the first embodiment.

FIG. 7 is a graph showing an example of changes in the blown air temperature over time in this embodiment. A double-dotted line in FIG. 7 shows an example of changes in the blown air temperature over time in the comparative example shown in FIGS. 5 and 6. That is, in the comparative example, the coolant circuit unit WU is disposed in the engine room 2 positioned on the front side of the interior air conditioning unit 30, and thereby a coolant pipe between the coolant circuit unit WU and the interior air conditioning unit 30 becomes longer. Thus, the amount of coolant is increased, leading to a high heat capacity of the coolant. Such a high heat capacity of the coolant would impair the air-temperature controllability.

In contrast, in this embodiment, the coolant circuit unit WU is disposed under the interior air conditioning unit 30, and thereby a coolant pipe between the coolant circuit unit WU and the interior air conditioning unit 30 can be shortened. Thus, the amount of coolant is decreased, thereby reducing the heat capacity of the coolant to a lower level. Such a low heat capacity of the coolant can suppress the impairment of the air-temperature controllability.

Therefore, this embodiment can achieve both improvements in the collision safety and the air-temperature controllability.

In this embodiment, the coolant circuit unit WU (the chiller 13 and the capacitor 14) is disposed at the center in the right-left direction of the vehicle. Thus, the coolant circuit unit WU is disposed while avoiding the occupant at the front seat as viewed from the front-back direction of the vehicle, thereby making it possible to improve the collision safety.

(Second Embodiment)

Figure 8:
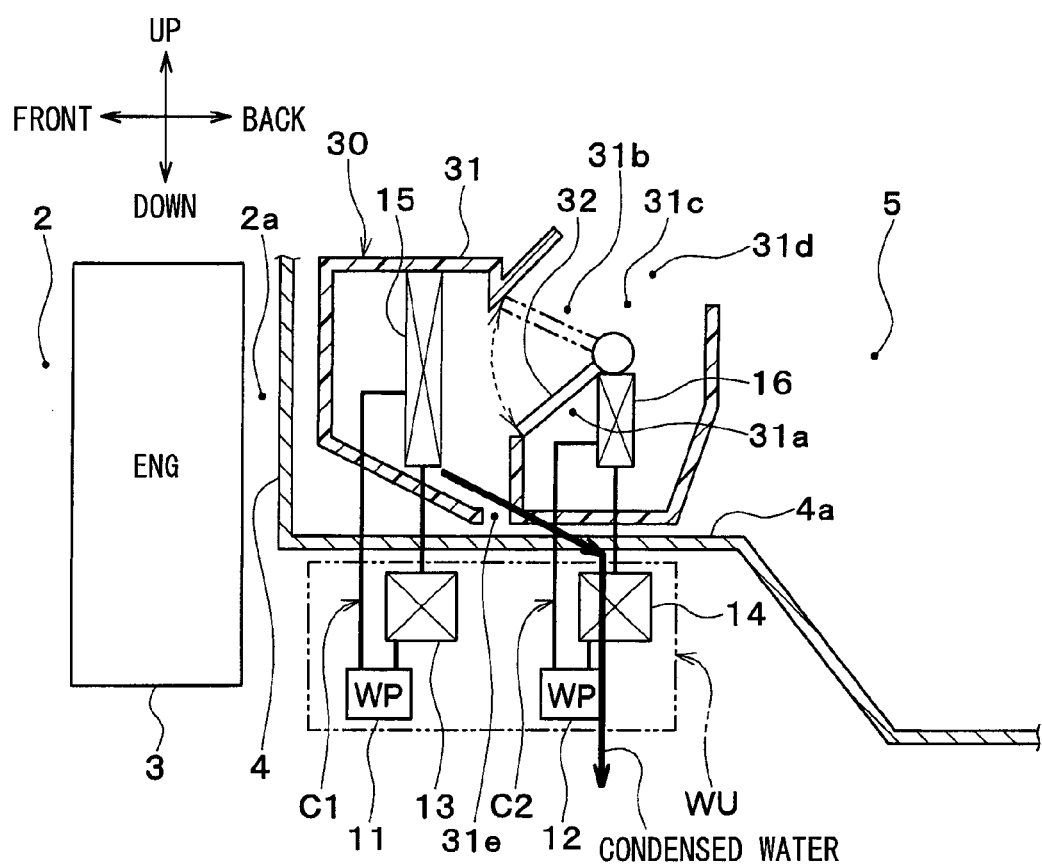
FIG. 8 is a cross-sectional view of a vehicle equipped with a vehicle air conditioner according to a second embodiment.
Figure 9:
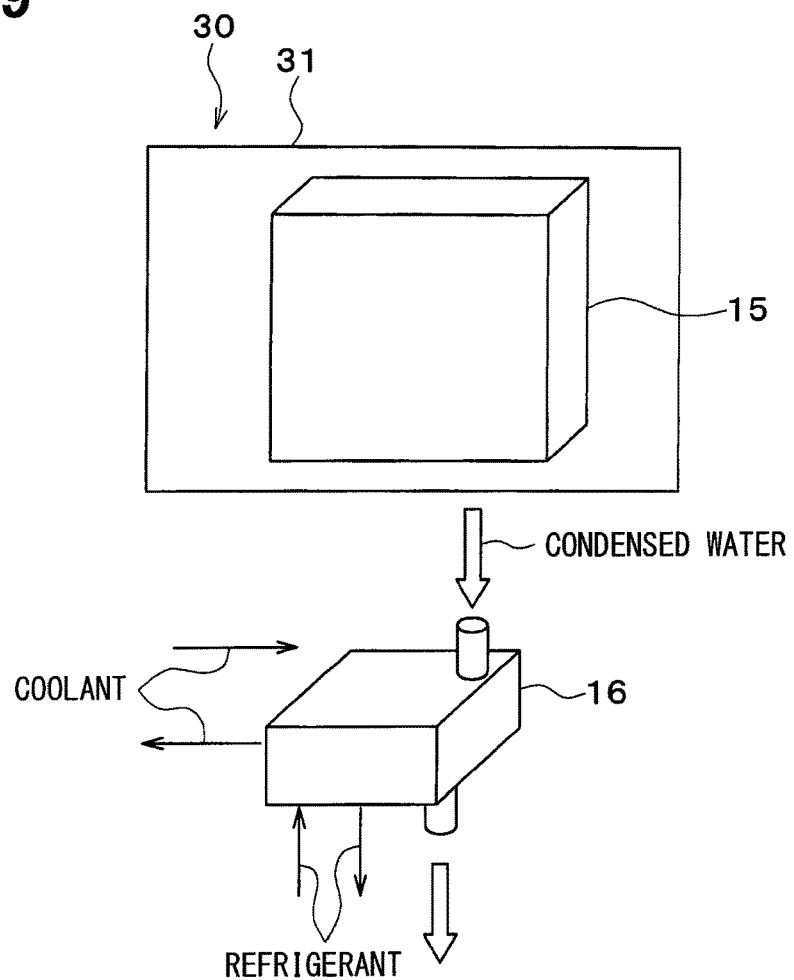
FIG. 9 is a partially schematic diagram of the vehicle air conditioner in the second embodiment.

In this embodiment, as shown in FIGS. 8 and 9, condensed water discharged from the drain-water discharge port 31e of the casing 31 is guided to the capacitor 14. Thick arrows in FIGS. 8 and 9 schematically illustrate the flows of condensed water.

Specifically, one end of a drain hose (not shown) is connected to the drain-water discharge port 31e of the casing 31, and the other end of the drain hose is connected to the capacitor 14. The condensed water guided by the drain hose to the capacitor 14 flows through the inside or surface of the capacitor 14. Thus, the condensed water guided to the capacitor 14 cools at least one of the refrigerant and the coolant flowing through the inside of the capacitor 14.

In this embodiment, the capacitor 14 is disposed at the position where the condensed water generated within the casing 31 falls by gravity. Thus, the condensed water can be used to improve the refrigerant cooling capacity of the capacitor 14.

(Third Embodiment)

While in the second embodiment, at least one of the refrigerant and coolant flowing through the capacitor 14 is cooled by the condensed water from the drain-water discharge port 31e, in this embodiment, a high-pressure side refrigerant in the refrigeration cycle 20 or a coolant in the second coolant circuit C2 is cooled by the condensed water from the drain-water discharge port 31e.

Figure 10:
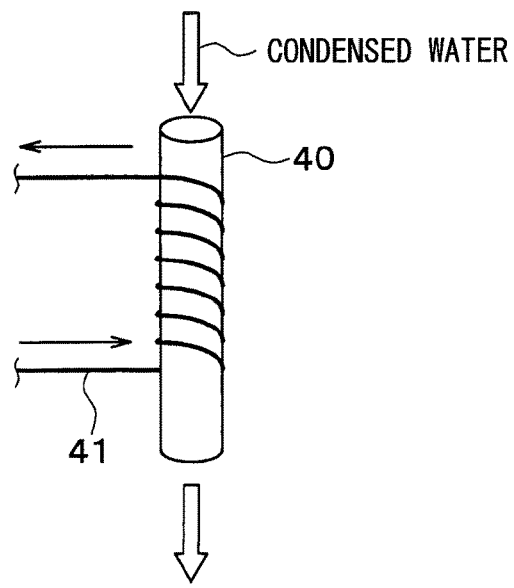
FIG. 10 is a partially schematic diagram of the vehicle air conditioner according to a third embodiment.

Specifically, as shown in FIG. 10, a pipe 41 is in thermally conductive contact with a drain hose 40. The high-pressure side refrigerant in the refrigeration cycle 20 or the coolant in the second coolant circuit C2 flows through the pipe 41.

The drain hose 40 and the pipe 41 serve as a condensed water-refrigerant heat exchanger that exchanges heat between the condensed water generated within the casing 31 and the refrigerant, or a condensed water-coolant heat exchanger (third heat exchanger) that exchanges heat between the condensed water generated within the casing 31 and the coolant (heat medium).

A part of the pipe 41 in contact with the drain hose 40 is formed of metal having a high thermal conductivity, such as aluminum.

A part of the drain hose 40 in contact with the pipe 41 is also formed of metal having a high thermal conductivity, such as aluminum. The part has a spiral groove or spiral protrusion formed at an inner wall surface thereof. Thus, the condensed water flowing through the inside of the part tends to spread over the inner wall surface. A heat transfer fin (inner fin) for promoting the heat exchange may be formed in the drain hose 40.

In this embodiment, the drain hose 40 and the pipe 41 are arranged at the positions where the condensed water generated within the casing 31 falls by gravity. In this way, the condensed water can be used to cool the high-pressure side refrigerant or coolant.

(Fourth Embodiment)

Figure 11:
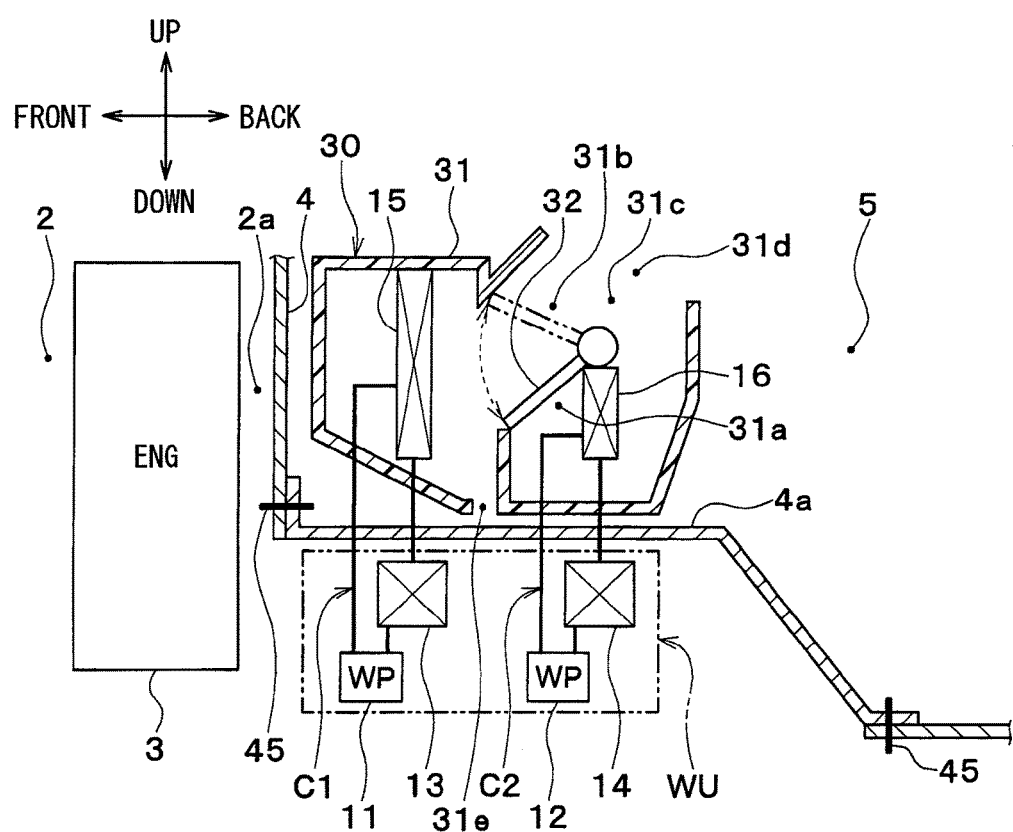
FIG. 11 is a cross-sectional view of a vehicle equipped with a vehicle air conditioner according to a fourth embodiment.

In this embodiment, as shown in FIG. 11, the protruding portion 4a of the firewall 4 is formed separately from other parts of the firewall 4.

The protruding portion 4a is fixed to the other parts of the firewall 4 by fastening means, such as a bolt 45. The interior air conditioning unit 30 and the coolant circuit unit WU are fixed to the protruding portion 4a by the fastening means, such as the bolt.

Now, an assembly procedure of these components will be described. First, the interior air conditioning unit 30 and the coolant circuit unit WU are assembled to the protruding portion 4a, and then the protruding portion 4a is assembled to the other parts of the firewall 4.

In this embodiment, the protruding portion 4a of the firewall 4 is formed separately from the remaining parts of the firewall 4, and the interior air conditioning unit 30 (casing 31) and the coolant circuit unit WU (chiller 13 and capacitor 14) are fixed to the protruding portion 4a.

Thus, the interior air conditioning unit 30 and the coolant circuit unit WU can be integrally mounted on a vehicle, thereby improving the vehicle mountability of the interior air conditioning unit 30 and the coolant circuit unit WU.

(Fifth Embodiment)

Figure 12:
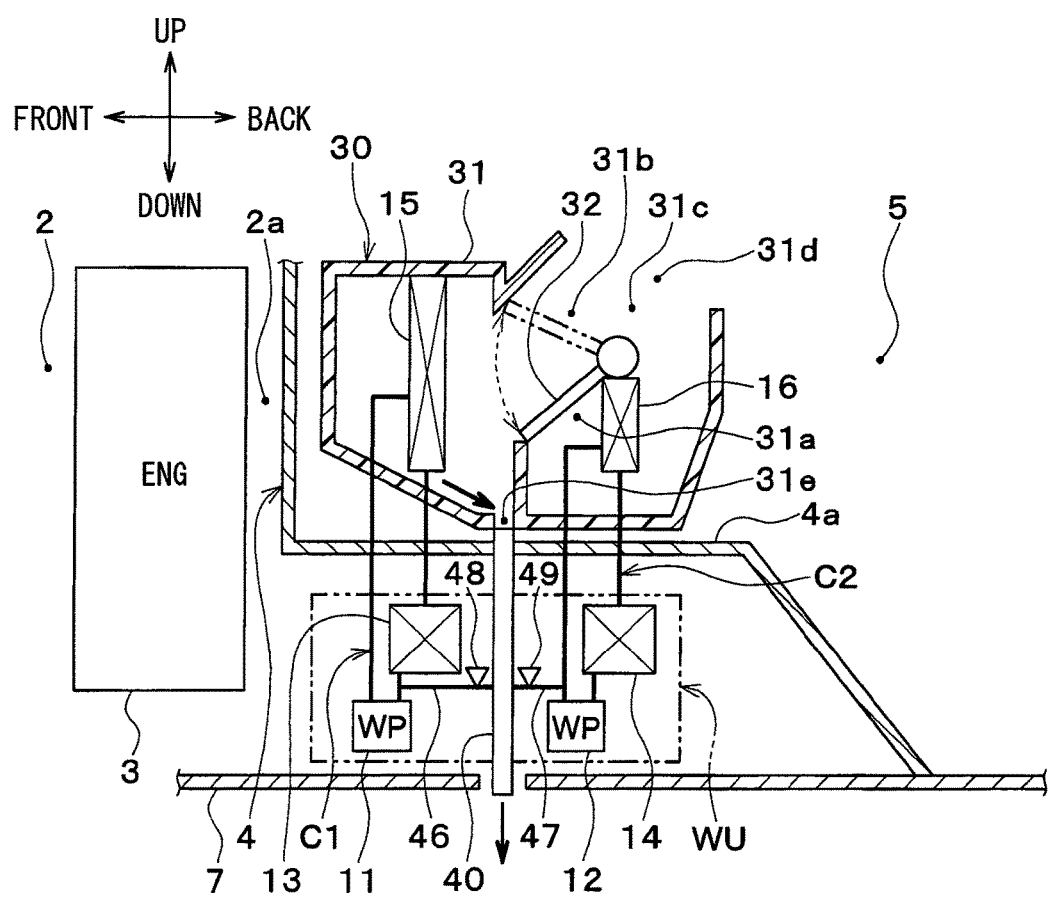
FIG. 12 is a cross-sectional view of a vehicle equipped with a vehicle air conditioner according to a fifth embodiment.

In this embodiment, as shown in FIG. 12, a first coolant discharge hose 46 and a second coolant discharge hose 47 are merged into the drain hose 40 that discharges the condensed water from the casing 31.

The first coolant discharge hose 46 is a coolant discharge hose (heat-medium discharge hose) that discharges the coolant (heat medium) in the first coolant circuit C1. The second coolant discharge hose 47 is a coolant discharge hose (heat-medium discharge hose) that discharges therefrom the coolant (heat medium) in the second coolant circuit C2.

A first discharge valve 48 is disposed in the first coolant discharge hose 46. The first discharge valve 48 opens and closes a coolant flow path in the first coolant discharge hose 46.

A second discharge valve 49 is disposed in the second coolant discharge hose 47. The second discharge valve 49 opens and closes a coolant flow path in the second coolant discharge hose 47.

The first coolant discharge hose 46, the second coolant discharge hose 47, the first discharge valve 48, and the second discharge valve 49 are used to discharge the coolant from the first coolant circuit C1 and the second coolant circuit C2 in a maintenance work and the like.

In this embodiment, the first coolant discharge hose 46 and the second coolant discharge hose 47 are merged into the drain hose 40.

Thus, the number of hoses protruding from below an under panel 7 of the vehicle can be minimized, thereby suppressing the degradation in the vehicle aerodynamic performance due to the hose, while decreasing the number of parts.

(Sixth Embodiment)

This embodiment includes both the first coolant circuit C1 and the second coolant circuit C2. Alternatively, as shown in FIGS. 13 and 14, this embodiment may include one of the first coolant circuit C1 and the second coolant circuit C2.

Figure 13:
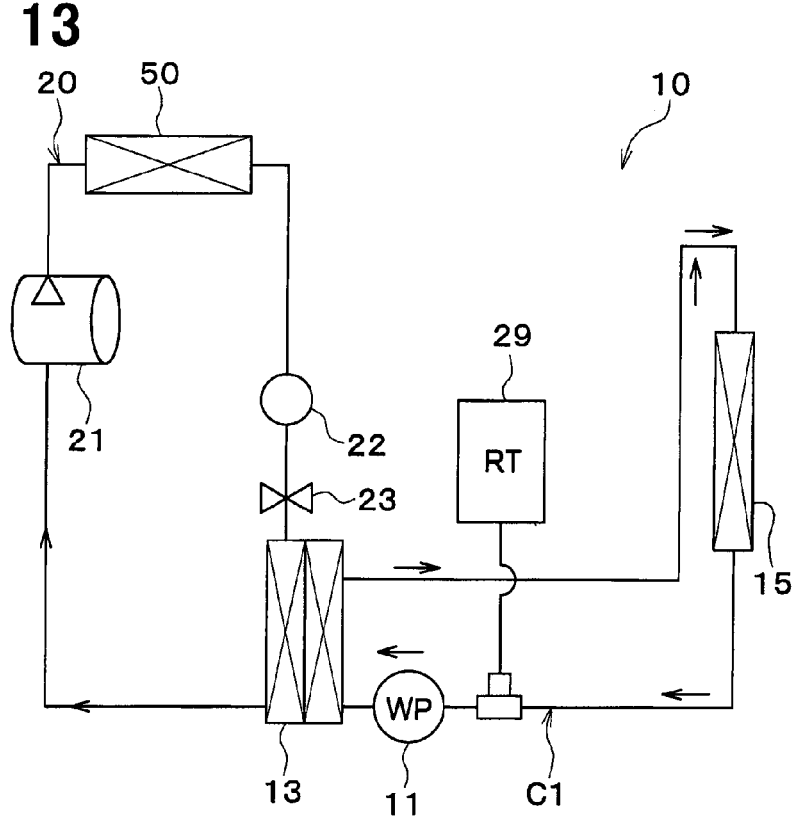
FIG. 13 is a partially schematic diagram of the vehicle air conditioner in a first example of a sixth embodiment.
Figure 14:
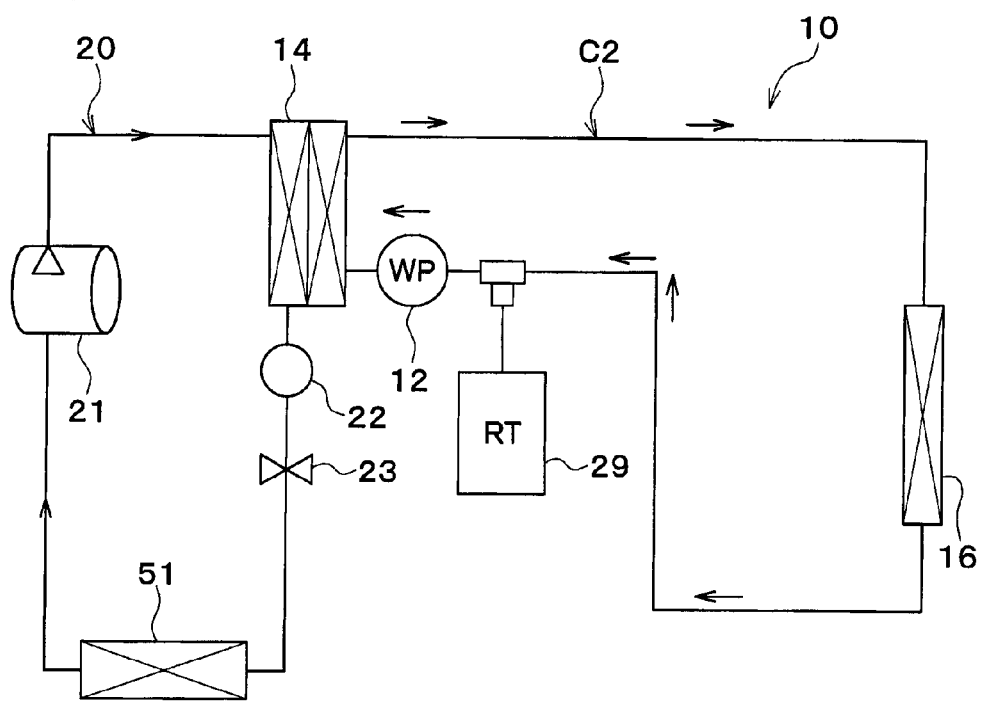
FIG. 14 is a partially schematic diagram of the vehicle air conditioner in a second example of the sixth embodiment.

In an example shown in FIG. 13, the first coolant circuit C1 is provided, while in an example shown in FIG. 14, the second coolant circuit C2 is provided.

In the example shown in FIG. 13, a high-pressure side heat exchanger 50 is provided, in place of the capacitor 14 described in the above-mentioned embodiments, to exchange heat between the high-pressure side refrigerant in the refrigeration cycle 20 and the air. Thus, the high-pressure side refrigerant discharged from the compressor 21 exchanges heat with the air and is thereby cooled.

In the example shown in FIG. 14, a low-pressure side heat exchanger 51 is provided, in place of the chiller 13 described in the above-mentioned embodiments, to exchange heat between the low-pressure side refrigerant in the refrigeration cycle 20 and the air.

In the examples shown in FIGS. 13 and 14, other parts are configured to exhibit the same functions as those of parts denoted by the same reference numerals in the embodiments described above.

(Other Embodiments)

The above-mentioned embodiments can be appropriately combined together. For example, various modifications and changes can be made to the above-mentioned embodiments in the following way.

(1) Although in the above-mentioned embodiments, the coolant is used as the heat medium that passes through the first coolant circuit C1 and the second coolant circuit C2, various kinds of media, including oil, may be used as the heat medium. The heat medium in use may be an ethylene glycol based antifreeze solution, water, air maintained at a certain temperature or higher, or the like.

Alternatively, nanofluid may be used as the heat medium. The nanofluid is a fluid that contains nanoparticles having a diameter of the order of nanometer. By mixing the nanoparticles into the heat medium, the following functions and effects can be obtained, in addition to the function and effect of decreasing a solidifying point, like a coolant (so-called antifreeze solution) using ethylene glycol.

That is, the nanoparticles can exhibit the functions and effects of improving the thermal conductivity in a specific temperature range, increasing the thermal capacity of the heat medium, preventing the corrosion of a metal pipe and the degradation in a rubber pipe, and enhancing the fluidity of the heat medium at an ultralow temperature.

These functions and effects are varied depending on the configuration, shape, and blending ratio of the nanoparticles, and additive material.

Thus, the mixture of nanoparticles can improve its thermal conductivity, and thus the heat medium even in a small amount can exhibit substantially the same cooling efficiency, compared with the coolant using ethylene glycol.

Further, as the thermal capacity of the heat medium can be increased, a cold storage amount (cold storage due to its sensible heat) of the heat medium itself can be increased.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), and an Au nanoparticle-containing CNT.

(2) In the refrigeration cycle 20 of the above-mentioned embodiments, a fluorocarbon refrigerant is used as the refrigerant. However, the kind of refrigerant in use is not limited thereto, and may be natural refrigerant, such as carbon dioxide and a hydrocarbon based refrigerant.

The refrigeration cycle 20 in the above-mentioned embodiments configures the subcritical refrigeration cycle in which its high-pressure side refrigerant pressure does not exceed the critical pressure of the refrigerant, but may configure a super-critical refrigeration cycle in which its high-pressure side refrigerant pressure exceeds the critical pressure of the refrigerant.

What is claimed is:

1. An air conditioner for a vehicle, comprising:
a first heat exchanger that exchanges heat between a refrigerant in a refrigeration cycle and a heat medium;
a second heat exchanger that exchanges heat between air to be blown into a vehicle interior space and the heat medium, the second heat exchanger is disposed in the vehicle interior space; and a casing disposed in the vehicle interior space to form an air passage through which the air flows, the casing being adapted to accommodate the second heat exchanger, wherein the first heat exchanger is disposed under the casing, and a partition wall for partitioning an engine room from the vehicle interior space is interposed between the first heat exchanger and the casing, wherein the partition wall includes an interposition part that is disposed directly below the casing to define a vehicle lower space under the interposition part, and the vehicle lower space communicates with the engine room and the first heat exchanger is disposed in the vehicle lower space;

the partition wall having an upper portion, wherein the upper portion is more forward to an engine that the first heat exchanger.

2. The air conditioner for a vehicle according to claim 1, wherein the partition wall includes a wall part that is formed separately from the interposition part, and the casing and the first heat exchanger are fixed to the interposition portion of the partition wall.

3. The air conditioner for a vehicle according to claim 1, wherein the first heat exchanger is disposed at a position where condensed water generated within the casing falls by gravity.

4. The air conditioner for a vehicle according to claim 1, further comprising:

a condensed water-refrigerant heat exchanger that exchanges heat between condensed water generated within the casing and the refrigerant, wherein the condensed water-refrigerant heat exchanger is disposed at a position where the condensed water within the casing falls by gravity.

5. The air conditioner for a vehicle according to claim 1, further comprising:

a third heat exchanger that exchanges heat between condensed water generated within the casing and the heat medium, wherein the third heat exchanger is disposed at a position where the condensed water within the casing falls by gravity.

6. The air conditioner for a vehicle according to claim 1, further comprising:

a condensed-water discharge hose that discharges condensed water generated within the casing to the outside of the vehicle; and a heat-medium discharge hose that discharges the heat medium to an outside of the vehicle, wherein the heat-medium discharge hose is joined to the condensed-water discharge hose.

7. The air conditioner for a vehicle according to claim 1, wherein the first heat exchanger is disposed at a center part in a right-left direction of the vehicle.

8. The air conditioner for a vehicle according to claim 1, wherein the partition wall includes a wall part extending in an up-down direction and the interposition part, and the interposition part extends to a vehicle rear side from a lower end of the wall part to define the vehicle lower space at a vehicle rear side of the wall part.

9. The air conditioner for a vehicle according to claim 8, wherein the wall part of the partition wall partitions from each other the engine room located at a vehicle front side of the wall part and the vehicle interior space located at a vehicle rear side of the wall part.

10. An air conditioner for a vehicle, comprising:

a first heat exchanger that exchanges heat between a refrigerant in a refrigeration cycle and a heat medium;

a second heat exchanger that exchanges heat between air to be blown into a vehicle interior space and the heat medium, the second heat exchanger is disposed in the vehicle interior space;

a casing disposed in the vehicle interior space to form an air passage through which the air flows, the casing being adapted to accommodate the second heat exchanger; and a condensed water-refrigerant heat exchanger that exchanges heat between condensed water generated within the casing and the refrigerant, wherein the first heat exchanger is disposed under the casing, and a partition wall for partitioning an engine room from the vehicle interior space is interposed between the first heat exchanger and the casing, wherein the partition wall includes an interposition part that is disposed directly below the casing to define a vehicle lower space under the interposition part, and the vehicle lower space communicates with the engine room, and the first heat exchanger and the condensed water-refrigerant heat exchanger are disposed in the vehicle lower space;

the partition wall having an upper portion, wherein the upper portion is more forward to an engine that the first heat exchanger.

11. The air conditioner for a vehicle according to claim 10, wherein the partition wall includes a wall part that is formed separately from the interposition part, and the casing and the first heat exchanger are fixed to the interposition portion of the partition wall.

12. The air conditioner for a vehicle according to claim 10, wherein the first heat exchanger is disposed at a position where condensed water generated within the casing falls by gravity.

13. The air conditioner for a vehicle according to claim 10, wherein the condensed water-refrigerant heat exchanger is disposed at a position where the condensed water within the casing falls by gravity.

14. The air conditioner for a vehicle according to claim 10, further comprising:

a condensed-water discharge hose that discharges condensed water generated within the casing to the outside of the vehicle; and a heat-medium discharge hose that discharges the heat medium to an outside of the vehicle, wherein the heat-medium discharge hose is joined to the condensed-water discharge hose.

15. The air conditioner for a vehicle according to claim 10, wherein the first heat exchanger is disposed at a center part in a right-left direction of the vehicle.

16. The air conditioner for a vehicle according to claim 10, wherein the partition wall includes a wall part extending in an up-down direction and the interposition part, and the interposition part extends to a vehicle rear side from a lower end of the wall part to define the vehicle lower space at a vehicle rear side of the wall part.

17. The air conditioner for a vehicle according to claim 16, wherein the wall part of the partition wall partitions from each other the engine room located at a vehicle front side of the wall part and the vehicle interior space located at a vehicle rear side of the wall part.

* * * * *